(12) United States Patent
Tomizawa

(10) Patent No.: US 11,239,725 B2
(45) Date of Patent: Feb. 1, 2022

(54) DRIVE APPARATUS

(71) Applicant: DENSO CORPORATION, Kariya (JP)

(72) Inventor: Hiroki Tomizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 124 days.

(21) Appl. No.: 16/708,848

(22) Filed: Dec. 10, 2019

(65) Prior Publication Data

US 2020/0195085 A1 Jun. 18, 2020

(30) Foreign Application Priority Data

Dec. 12, 2018 (JP) .............................. JP2018-232562

(51) Int. Cl.
*H02K 5/10* (2006.01)
*H02K 5/22* (2006.01)
*H02K 7/00* (2006.01)
*H02K 7/116* (2006.01)

(52) U.S. Cl.
CPC .............. *H02K 5/225* (2013.01); *H02K 5/10* (2013.01); *H02K 7/003* (2013.01); *H02K 7/006* (2013.01); *H02K 7/116* (2013.01)

(58) Field of Classification Search
CPC .......... H02K 5/225; H02K 5/10; H02K 7/003; H02K 7/006
USPC ........................................................ 310/83
See application file for complete search history.

(56) References Cited

U.S. PATENT DOCUMENTS

| 9,551,411 | B2* | 1/2017 | Suto .......................... F16H 1/16 |
| 2012/0161558 | A1 | 6/2012 | Yamasaki et al. |
| 2016/0218583 | A1 | 7/2016 | Hayashi |
| 2016/0347353 | A1 | 12/2016 | Wada et al. |
| 2017/0005539 | A1 | 1/2017 | Yamasaki |
| 2017/0008554 | A1 | 1/2017 | Hirotani et al. |

FOREIGN PATENT DOCUMENTS

| JP | 2010104212 | * | 5/2010 | ............ H02K 3/522 |
| JP | 5692575 | B2 | 4/2015 | |
| JP | 2016019308 | A | 2/2016 | |
| JP | 2016136829 | A | 7/2016 | |
| JP | 2016140149 | A | 8/2016 | |
| JP | 2017017866 | A | 1/2017 | |
| WO | 2015119224 | A | 8/2015 | |
| WO | 2015122069 | A | 8/2015 | |

* cited by examiner

*Primary Examiner* — Terrance L Kenerly
(74) *Attorney, Agent, or Firm* — Maschoff Brennan

(57) ABSTRACT

An electric motor includes: a stator; windings wound around the stator; a rotor configured to rotate relative to the stator; a shaft; and a motor case. The shaft is configured to rotate integrally with the rotor, and one end portion of the shaft is coupled to a speed reducing gear device. The motor case includes a tubular portion and a bottom portion, and an opposite side of the tubular portion, which is opposite to the bottom portion, opens. A large diameter portion is formed at an outer periphery of the bottom portion of the motor case and has an outer diameter, which is larger than an outer diameter of a stator fixation location of the motor case, to which the stator is fixed, while the large diameter portion is formed continuously with a contact surface of the bottom portion that is configured to contact a gear housing.

13 Claims, 12 Drawing Sheets

DRIVE APPARATUS

CROSS REFERENCE TO RELATED APPLICATION

This application is based on and incorporates herein by reference Japanese Patent Application No. 2018-232562 filed on Dec. 12, 2018.

TECHNICAL FIELD

The present disclosure relates to a drive apparatus.

BACKGROUND

A previously proposed drive apparatus has a motor unit received in a motor case. A gear device is installed to an installation surface of the motor case.

SUMMARY

This section provides a general summary of the disclosure, and is not a comprehensive disclosure of its full scope or all of its features.

According to one aspect of the present disclosure, there is provided a drive apparatus configured to transmit rotation of an electric motor to an external device. The drive apparatus includes a stator, a winding, a rotor, a shaft and a motor case. The winding is wound around the stator. The rotor is configured to rotate relative to the stator. The shaft is configured to rotate integrally with the rotor. One end portion of the shaft is configured to be coupled with the external device. The motor case includes a tubular portion and a bottom portion to have a bottomed tubular form, which opens at a side that is opposite to the bottom portion. The stator is fixed to the tubular portion, and the motor case is configured to be installed to a housing of the external device through the bottom portion.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

A previously proposed drive apparatus has a motor unit received in a motor case. For example, the motor case is shaped in a bottomed tubular form, and a frame is installed at an opening part of the motor case.

In a case where water is applied to the drive apparatus, the water flows along a tubular portion of the motor case and reaches to an installation surface of the motor case, to which a gear device is installed. Thereby, a connection of the motor case, which is connected to the gear device, may possibly corrode.

A drive apparatus of the present disclosure is configured to transmit rotation of an electric motor to an external device and includes: a stator; a winding that is wound around the stator; a rotor that is configured to rotate relative to the stator; a shaft; and a motor case. The shaft is configured to rotate integrally with the rotor, and one end portion of the shaft is configured to be coupled with the external device.

The motor case includes a tubular portion and a bottom portion to have a bottomed tubular form, which opens at a side that is opposite to the bottom portion. The stator is fixed to the tubular portion, and the motor case is configured to be installed to a housing of the external device through the bottom portion.

A large diameter portion is formed at an outer periphery of the bottom portion of the motor case and has an outer diameter, which is larger than an outer diameter of a stator fixation location of the motor case, to which the stator is fixed, while the large diameter portion is formed continuously with a contact surface of the bottom portion that is configured to contact the housing of the external device. In this way, even in the case where the water is applied to the drive apparatus, it is difficult for the water to reach a boundary surface between the drive apparatus and the external device. Therefore, the corrosion of the connection between the drive apparatus and the external device can be limited.

Hereinafter, a drive apparatus of the present disclosure will be described with reference to the drawings. In the following embodiments, portions, which are substantially identical to each other, will be indicated by the same reference signs and will not be described redundantly for the sake of simplicity.

First Embodiment

Figure 1:
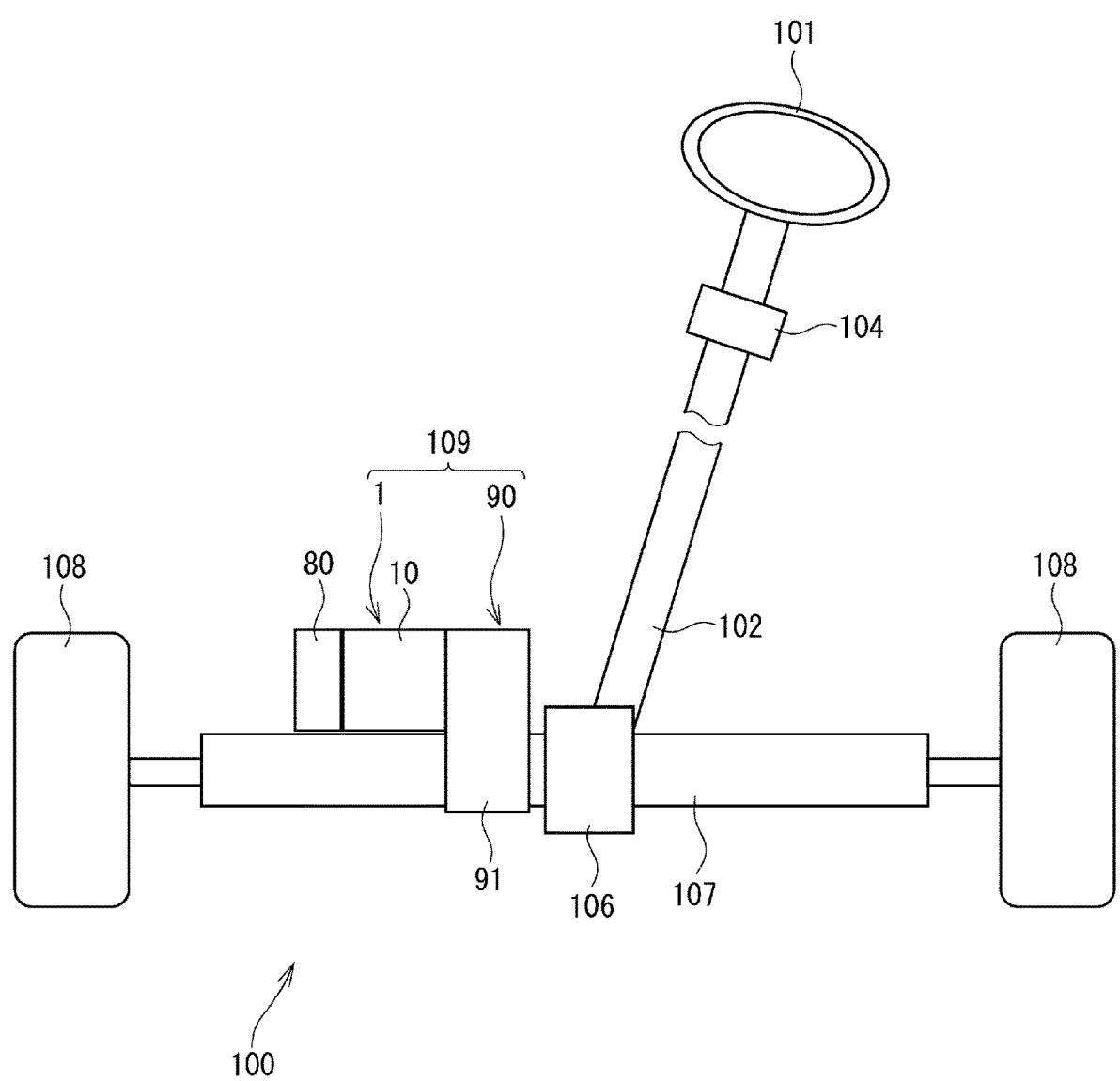
FIG. 1 is a diagram showing a structure of a steering system of a first embodiment.
Figure 2:
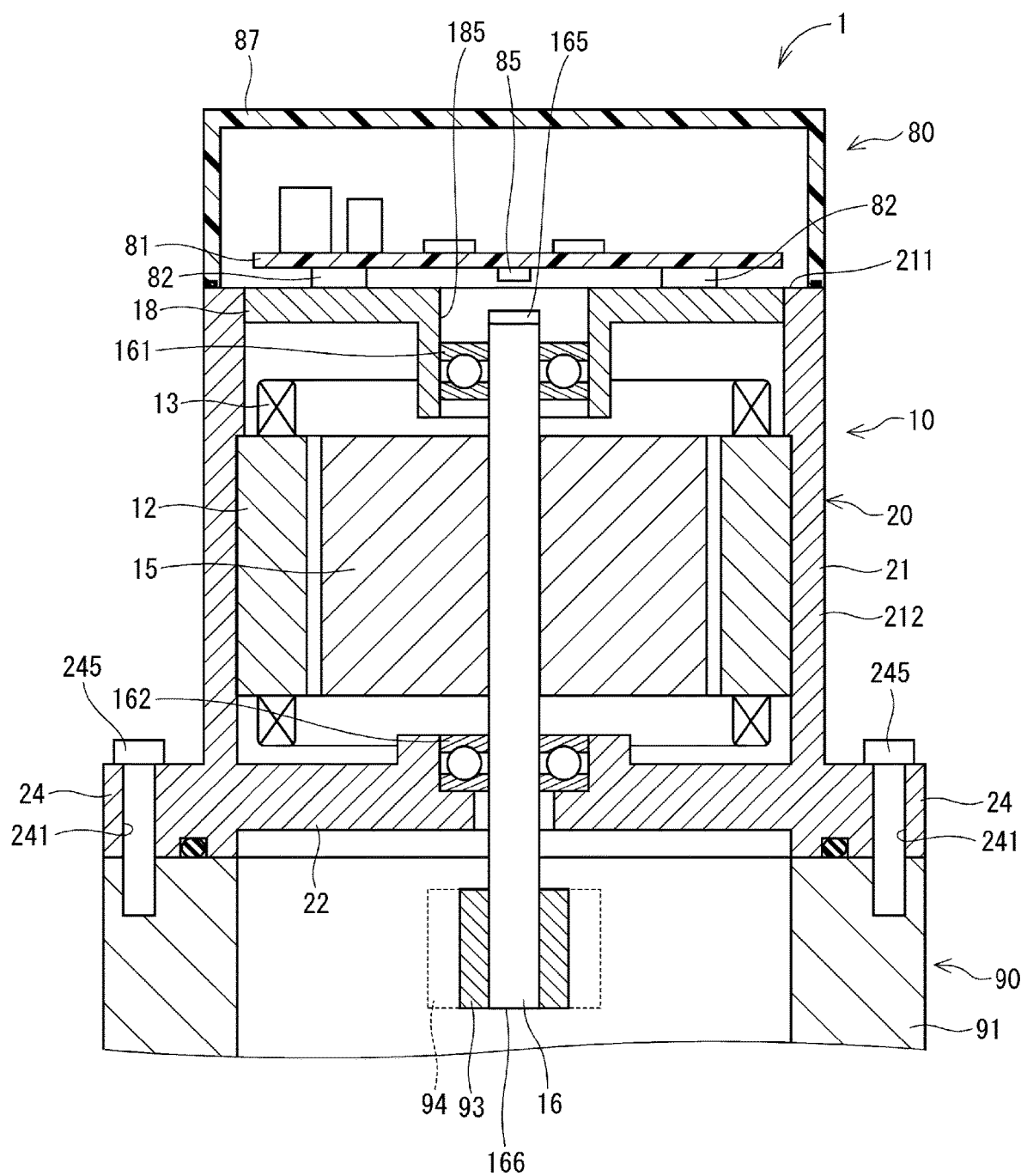
FIG. 2 is a schematic cross-sectional view of a drive apparatus of the first embodiment.

FIGS. 1 to 6 show a drive apparatus of a first embodiment. As shown in FIGS. 1 and 2, the drive apparatus 1 of the present embodiment includes an electric motor 10 and a controller device 80 and is applied to an electric power steering apparatus 109. FIG. 1 shows an overall structure of a steering system 100 that includes the electric power steering apparatus 109. The steering system 100 includes a steering wheel (serving as a steering member) 101, a steering shaft 102, a pinion gear 106, a rack shaft 107, two wheels 108 and the electric power steering apparatus 109.

The steering wheel 101 is connected to the steering shaft 102. A torque sensor 104 is installed to the steering shaft 102 to sense a torque that is applied to the steering shaft 102, for example, when a driver of a vehicle manipulates the steering wheel 101. The pinion gear 106 is installed to a distal end of the steering shaft 102. The pinion gear 106 is meshed with the rack shaft 107. The wheels 108 are respectively installed to two opposite ends of the rack shaft 107 through tie rods or the like.

When the driver rotates the steering wheel 101, the steering shaft 102, to which the steering wheel 101 is connected, is rotated. The rotational motion of the steering shaft 102 is converted into linear motion of the rack shaft 107 through the pinion gear 106. The wheels 108 are steered to a corresponding angle that corresponds to the amount of displacement of the rack shaft 107.

The electric power steering apparatus 109 includes the drive apparatus 1 and the speed reducing gear device 90. The speed reducing gear device 90 is a drive force transmission device that reduces a rotational speed of the rotation outputted from the electric motor 10 and transmits the rotation of the reduced speed to the rack shaft 107. The speed reducing gear device 90 includes a gear housing 91, a pulley 93 and a belt 94. The drive apparatus 1 is installed to the gear housing 91. The electric power steering apparatus 109 of the present embodiment is a so-called "rack assist type" that assists the driving of the rack shaft 107, and the electric power steering apparatus 109 is provided, for example, in an engine room of the vehicle (not shown).

A schematic structure of the drive apparatus 1 will be described with reference to FIG. 2. The electric motor 10 includes a stator 12, windings 13, a rotor 15, a shaft 16, a frame member 18 and a motor case 20. The stator 12 includes a laminated portion and an insulator. The laminated portion includes a plurality of thin plates, which are made of, for example, iron and are stacked one after another. The insulator is placed at an outer side of the laminated portion in an axial direction. The stator 12 is securely press fitted to an inside of the motor case 20. The windings 13 are made of conductive metal, such as copper, and are wound around the insulator of the stator 12.

The rotor 15 is shaped in a tubular form and is formed by stacking a plurality thin plates, which are made of, for example, iron. Permanent magnets are installed to an outer periphery of the rotor 15. The shaft 16 is shaped in a rod form and is made of, for example, metal. The shaft 16 is fixed to the rotor 15 and extends along a rotational axis of the rotor 15. The shaft 16 is rotatably supported by bearings 161, 162. Thereby, the rotor 15 and the shaft 16 are rotatable relative to the stator 12. A magnet 165 is installed to an end portion of the shaft 16, which is located on the controller device 80 side. The frame member 18 is fixed to an opening part 211 of the motor case 20. The frame member 18 has a shaft hole 185. The bearing 161 is fixed to the shaft hole 185.

The controller device 80 includes: a circuit board 81; various electronic components installed to the circuit board 81; and a cover 87. The circuit board 81 is fixed to the frame member 18. The circuit board 81 is provided with switching elements, which form an inverter configured to switch an electric power supply to the windings 13; a power source relay; a motor relay; a microcomputer, which is configured to execute various calculations involved in a drive control operation of the electric motor 10; a custom IC, which includes a pre-driver and the like; a capacitor; and an inductor. Heat generating components 82, which need to release heat generated therefrom, are installed to a surface of the circuit board 81 located on the frame member 18 side, so that the heat generating components 82 can release the heat to the frame member 18. The heat generating components 82 include, for example, the switching elements. Furthermore, the heat generating components 82 may include other elements, such as the power source relay and the motor relay, which are other than the switching elements. A rotational angle sensor 85 is installed to the surface of the circuit board 81 located on the frame member 18 side and is placed at a location where the rotational angle sensor 85 opposes the magnet 165.

Each of phase windings, which form the windings 13, is connected to a corresponding one of lead wires (not shown). The lead wires are inserted through insertion holes (not shown) of the frame member 18 toward the controller device 80 side and are connected to the circuit board 81. The cover 87 is shaped in a bottomed tubular form and is made of, for example, resin. The cover 87 is fixed to the motor case 20. The circuit board 81, to which the various electronic components are installed, is received in an inside space that is covered with the cover 87.

The motor case 20 is shaped in a bottomed tubular form and is formed by, for example, aluminum die casting. The motor case 20 includes a tubular portion 21 and a bottom portion 22. In the present embodiment, the bottom portion 22 is placed on the speed reducing gear device 90 side, and the opening part 211 of the tubular portion 21 is placed on the controller device 80 side. A plurality of flange portions 24, each of which projects toward a radially outer side, is formed at the bottom portion 22 of the motor case 20. In the present embodiment, the number of the flange portions 24 is two. A screw hole 241, which receives a screw 245, is formed at each of the flange portions 24. The screws 245 fix the motor case 20 and the gear housing 91 together.

Details of the motor case 20 will be described with reference to FIGS. 3 to 6. As shown in FIG. 4, a bearing portion 225 is formed at the bottom portion 22. The bearing portion 225 projects on the speed reducing gear device 90 side of a contact surface 221 that is configured to contact the gear housing 91, and the bearing portion 225 is inserted into a hole 915 of the gear housing 91. The bearing 162 is fixed to a hole 226 of the bearing portion 225. Furthermore, an oil seal 163 is installed on the speed reducing gear device 90 side of the bearing 162. An end portion 166 of the shaft 16, which is opposite to the controller device 80, extends into an inside of the gear housing 91.

The pulley 93 is installed to an outer periphery of the end portion 166 of the shaft 16. The pulley 93 is configured to rotate integrally with the shaft 16. The belt 94 is wound around the pulley 93. Thereby, the rotor 15, the shaft 16 and the pulley 93 are rotated integrally, and the rotation of the electric motor 10 is transmitted to the speed reducing gear device 90 through the belt 94.

A large diameter portion 25 is formed at an outer periphery of the bottom portion 22 of the motor case 20 such that the large diameter portion 25 projects on the radially outer side of a stator fixation location (stator fixation portion) 212 of the tubular portion 21, to which the stator 12 is fixed. A stepped surface 251, which extends continuously in the circumferential direction, is formed between the tubular portion 21 and the large diameter portion 25. In the present embodiment, the large diameter portion 25 circumferentially extends all around and is formed continuously with the flange portions 24. The large diameter portion 25 is formed continuously with the contact surface 221 of the bottom portion 22, which contacts the gear housing 91. Unlike the flange portions 24, the large diameter portion 25 extends in the circumferential direction and radially projects from the tubular portion 21 by the amount that corresponds to a generally constant radial thickness of the large diameter portion 25.

Figure 5:
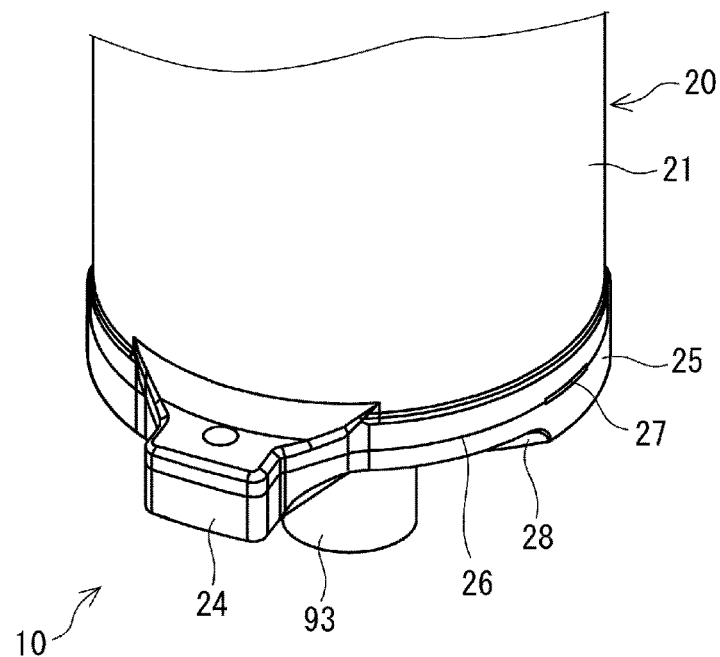
FIG. 5 is a perspective view of an electric motor of the first embodiment.
Figure 6:
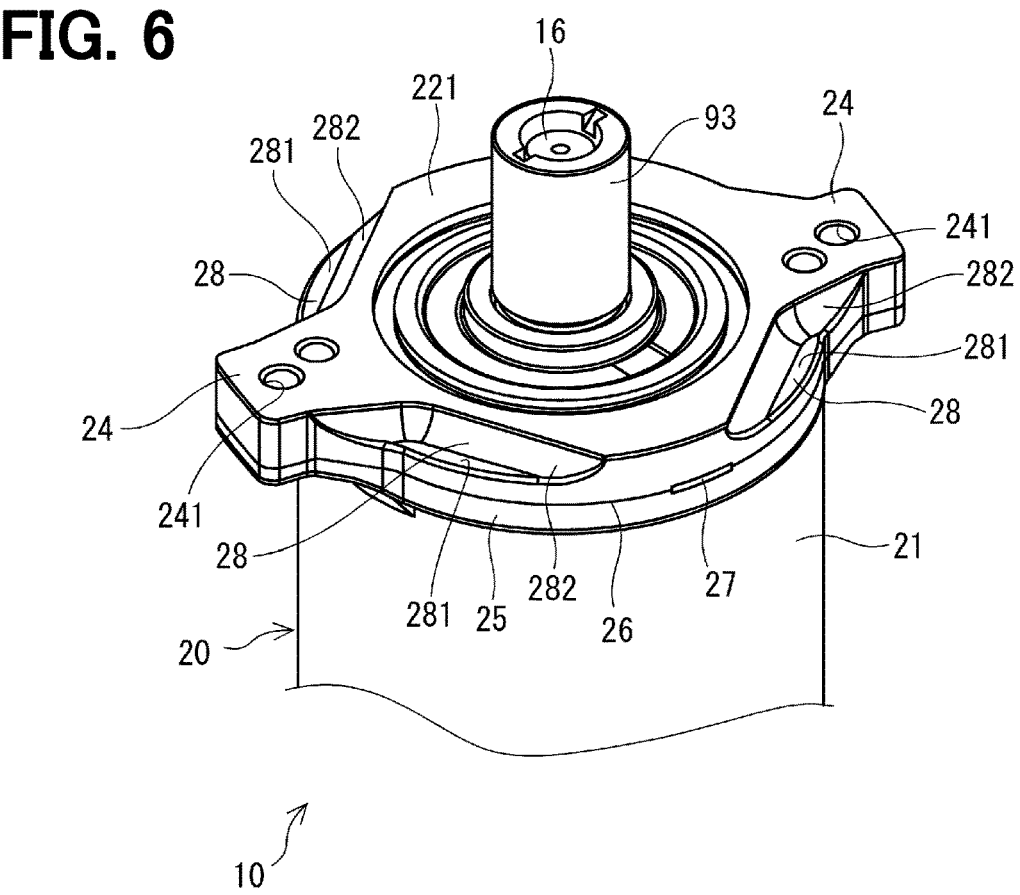
FIG. 6 is another perspective view of the electric motor of the first embodiment.

As shown in FIGS. 5 and 6, a parting line (parting residue) 26 and a gate residue 27 are formed at an outer peripheral surface of the large diameter portion 25. The motor case 20 of the present embodiment is manufactured by using two dies (not shown) such that a parting surface is located at a location of the large diameter portion 25. The dies are configured to open in the axial direction of the motor case 20 by removing one of the dies from the other one of the dies in the axial direction, so that the parting line 26 is formed at the parting surface between the dies. Furthermore, a gate residue (gate trace) 27 is formed at least one location along the circumferential extent of the parting line 26 at the large diameter portion 25 and has a width that is measured in the axial direction and is larger than that of the parting line 26. The gate residue 27 is a residue of a gate that is used to inject molten metal into a cavity defined by the dies or a residue of a gate that is used to draw the molten metal into the cavity to thoroughly fill the cavity with the molten metal.

Figure 17:
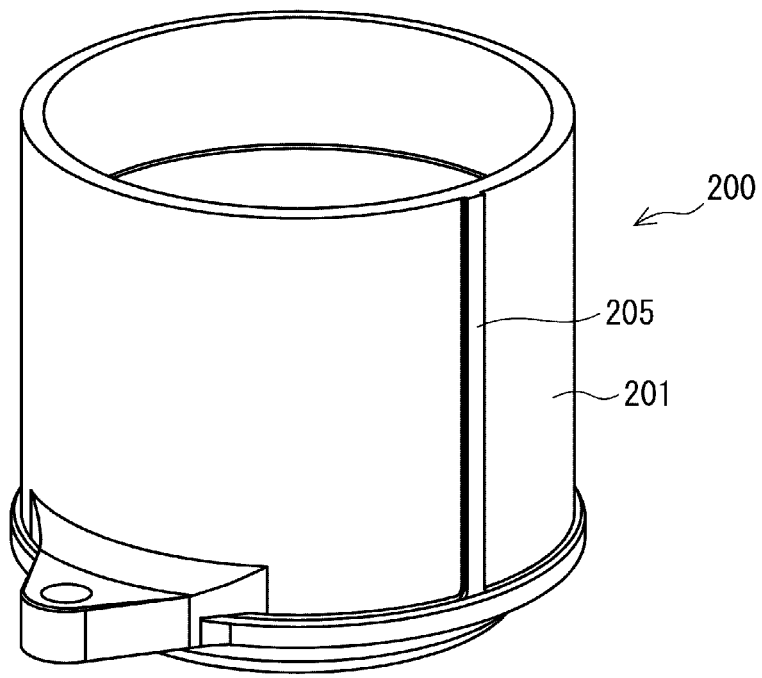
FIG. 17 is a perspective view of a motor case of a comparative example.

Like in a case of a comparative example shown in FIG. 17, when a motor case 200 is formed by using a slide core, a ridge 205, which is a parting line linearly extending in the axial direction, is formed at the radially outer side of the tubular portion 201. When the ridge 205, which extends in the axial direction of the tubular portion 201, is formed, water tends to accumulate at a connection between the ridge 205 and the outer peripheral surface of the tubular portion 201 to possibly cause corrosion. Particularly, in the case of salt water, it is easy to corrode. Furthermore, in the case where the ridge 205 is formed at the tubular portion 201, the ridge 205 may possibly become an obstructive at the time of mounting the drive apparatus 1 to the vehicle or the like. Also, in the case where the ridge 205 is formed at the tubular portion 201, a stress may not be uniformly applied to the tubular portion 201 at the time of securely press fitting the stator 12 to the tubular portion 201.

The motor case 20 of the present embodiment is formed by the stationary die and the movable die without using the slide core. Here, the large diameter portion 25 is formed at the bottom portion 22, and there are used the stationary die and the movable die, which form the parting surface at the radially outer side of the large diameter portion 25. In this way, the draft angle of the tubular portion 21 can be minimized, and the size of the tubular portion 21 can be reduced or minimized. Furthermore, in the case where the large diameter portion 25 is formed, even when the water is applied to the tubular portion 21, the flow of water along the outer peripheral surface of the tubular portion 21 can be blocked at the large diameter portion 25. Therefore, intrusion of the water to the boundary surface between the motor case 20 and the gear housing 91 can be limited. Furthermore, the tubular portion 21 of the present embodiment does not have the ridge 205, which extends in the axial direction and is discussed with reference to the comparative example. Therefore, at the time of securely press fitting the stator 12 to the tubular portion 21, the stress is uniformly applied to the tubular portion 21. This structure is advantageous in terms of the strength.

Figure 3:
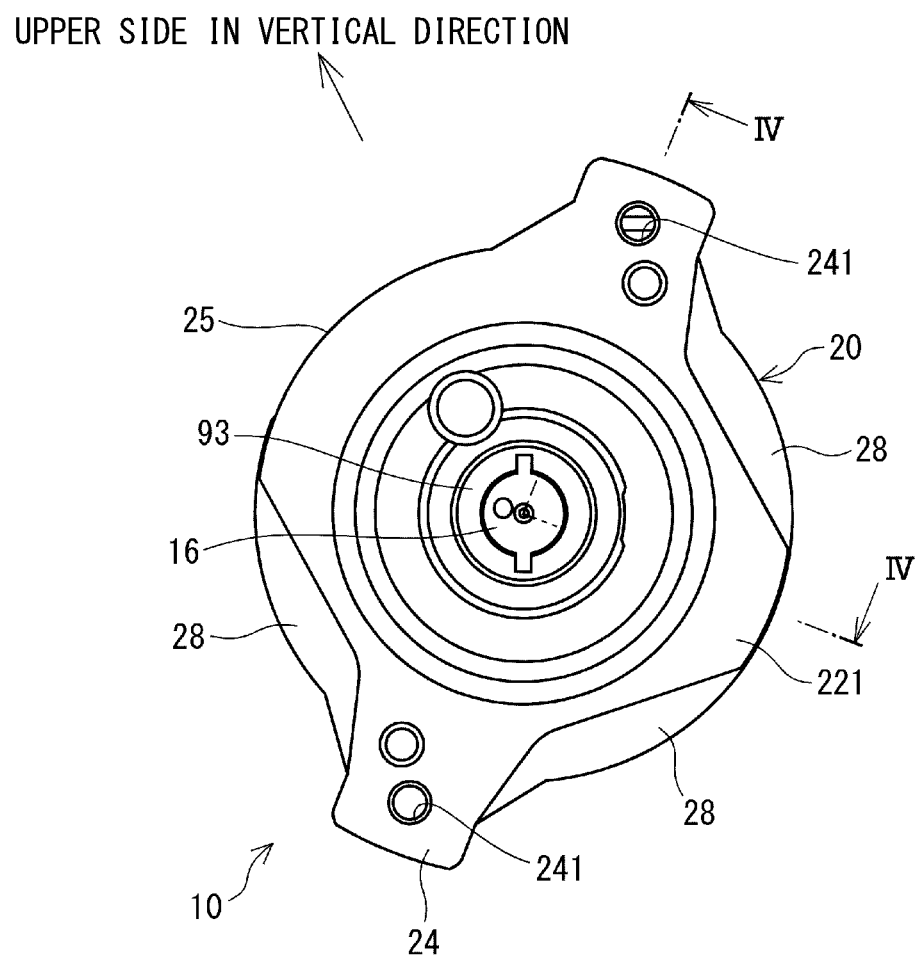
FIG. 3 is a bottom view of the drive apparatus of the first embodiment.
Figure 4:
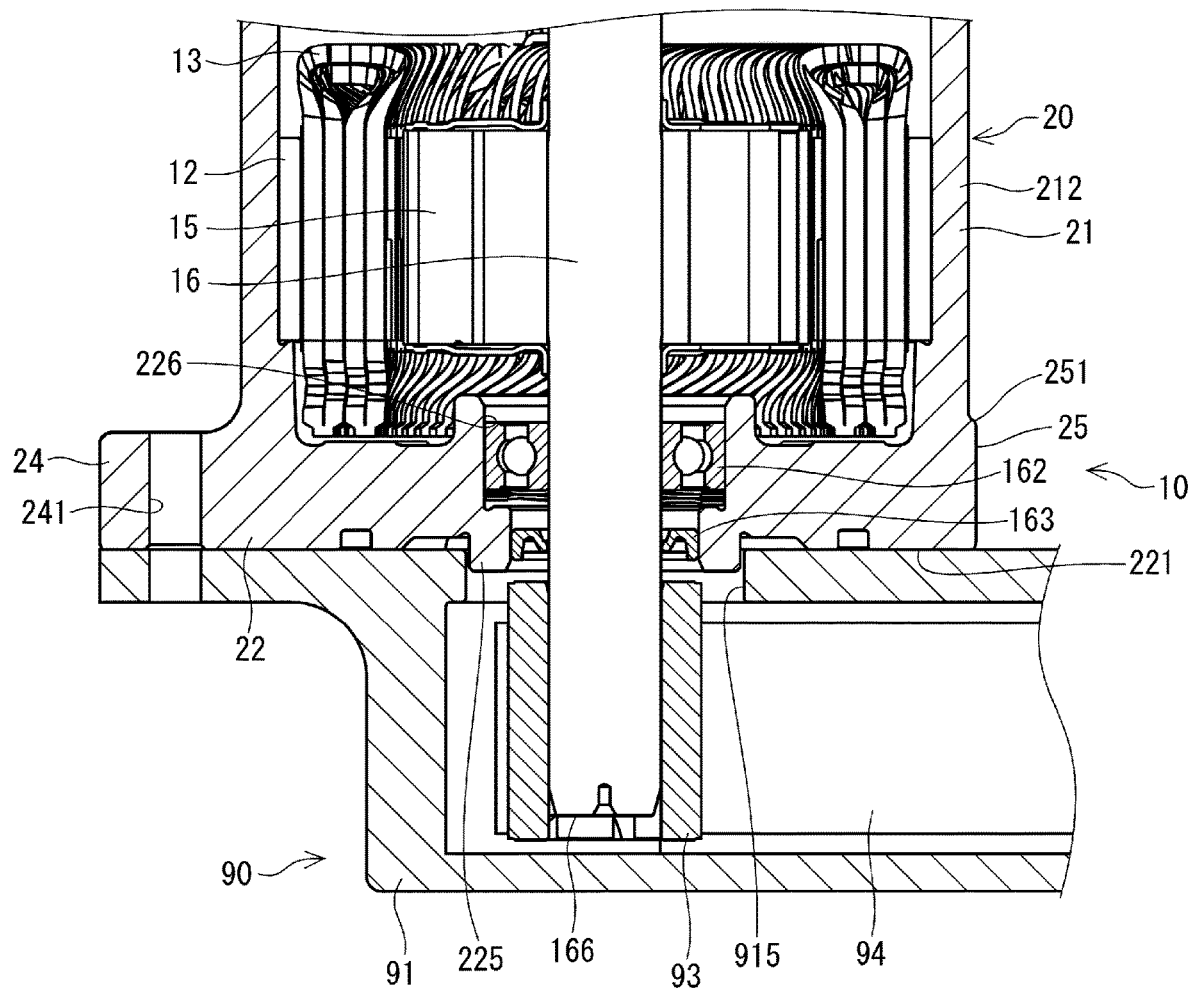
FIG. 4 is a cross-sectional view taken along line VI-VI in FIG. 3.

As shown in FIGS. 3, 5 and 6, the bottom portion 22 of the motor case 20 has a plurality of cutouts 28 that are respectively formed as a recess, which opens to the bottom surface (contact surface 221) side and the radially outer side of the bottom portion 22. Each of the cutouts 28 is located on the bottom surface side of the parting line 26 and is shaped in a form of a notch produced at the large diameter portion 25. Each cutout 28 includes a spaced surface 281 and a tilt surface 282 while the tilt surface 282 joins between the spaced surface 281 and the contact surface 221. When the motor case 20 is installed to the gear housing 91, the spaced surface 281 does not contact the gear housing 91 and is spaced from the gear housing 91.

The weight of the motor case 20 can be reduced by forming the cutouts 28. Furthermore, as shown in FIG. 3, none of the cutouts 28 is formed at a side of the large diameter portion 25 that becomes an upper side (top side) in the vertical direction at the time of installing the drive apparatus 1 at the vehicle. In this way, even when the water is applied to the drive apparatus 1, it is possible to limit accumulation of the water at the cutouts 28. In the present embodiment, the number of the cutouts 28 is three, and each of the cutouts 28 is formed at the location where the cutout 28 is formed continuously with an adjacent one or both of the flange portions 24. Specifically, two of the three cutouts 28 are respectively formed on two circumferentially opposite sides of a lower one of the flange portions 24 placed on the lower side in the vertical direction, and the other one of the three cutouts 28 is formed on one circumferential side of the other one of the flange portions 24. The shapes and the number of the cutouts 28 may be changed to any appropriate ones depending on a need.

As discussed above, the drive apparatus 1 of the present embodiment is configured to transmit the rotation of the electric motor 10 to the speed reducing gear device 90, which is the external device. The electric motor 10 of the drive apparatus 1 includes: the stator 12; the windings 13, which are wound around the stator 12; the rotor 15, which is configured to rotate relative to the stator 12; the shaft 16; and the motor case 20. The shaft 16 is configured to rotate integrally with the rotor 15, and the end portion 166 of the shaft 16 is coupled to the speed reducing gear device 90. The motor case 20 is shaped in the bottomed tubular form and includes the tubular portion 21 and the bottom portion 22, and the opposite side of the tubular portion 21, which is opposite to the bottom portion 22, opens. In the motor case 20, the stator 12 is fixed to the tubular portion 21, and the motor case 20 is installed to the gear housing 91, which is the housing of the speed reducing gear device 90, through the bottom portion 22 of the motor case 20.

The large diameter portion 25 is formed at the outer periphery of the bottom portion 22 of the motor case 20 and has the outer diameter, which is larger than the outer diameter of the stator fixation location 212 of the motor case 20, to which the stator 12 is fixed, while the large diameter portion 25 is formed continuously with the contact surface 221 of the bottom portion 22 that is configured to contact the gear housing 91. In the present embodiment, the large diameter portion 25 circumferentially extends all around along the entire circumferential extent of the tubular portion 21. Furthermore, the motor case 20 includes the flange portions 24, each of which radially outwardly projects and contacts the gear housing 91. The large diameter portion 25 is formed continuously with the flange portions 24. In this way, even in the case where the water is applied to the drive apparatus 1, it is difficult for the water to reach the boundary surface between the electric motor 10 and the speed reducing gear device 90. Therefore, the corrosion of the connection between the electric motor 10 and the speed reducing gear device 90 can be limited.

The parting line 26, which radially outwardly projects and extends continuously in the circumferential direction, is formed at the large diameter portion 25. At least one location of the large diameter portion 25 has the gate residue 27, which has the width that is larger than the width of the parting line 26. In the present embodiment, the large diameter portion 25 is formed at the bottom portion 22. Thus, it is possible to form the motor case 20 by the dies that open in the axial direction without using the slide core while the draft angle of the tubular portion 21 is set to be small. In the present embodiment, the motor case 20 is formed such that the parting surface is placed at the location where the large diameter portion 25 is formed. Therefore, the parting line 26 and the gate residue 27 are formed at the large diameter portion 25.

The large diameter portion 25 has the cutouts 28, each of which is a recess that opens at the bottom surface side and the radially outer side of the large diameter portion 25. Thereby, the weight of the motor case 20 can be reduced or minimized. Furthermore, each of the cutouts 28 is formed at the corresponding location of the large diameter portion 25 that does not become the upper side in the vertical direction at the time of installing the motor case 20 to the speed reducing gear device 90. In this way, even when the water is applied to the drive apparatus 1, it is possible to limit accumulation of the water at the cutouts 28. Thus, corrosion of a connection between the drive apparatus 1 and the speed reducing gear device 90 can be limited.

Second Embodiment

Figure 7:
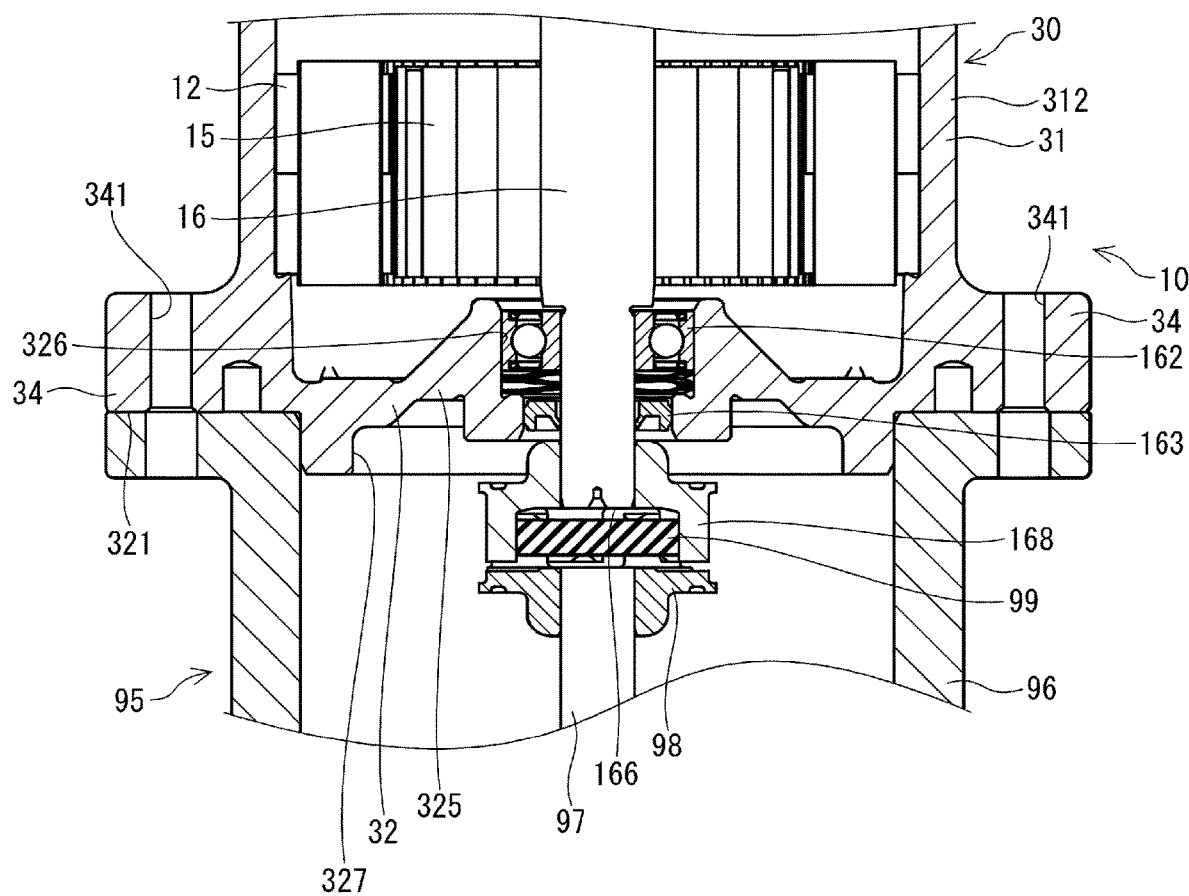
FIG. 7 is a cross-sectional view of an electric motor and a speed reducing gear device of a second embodiment.
Figure 8:
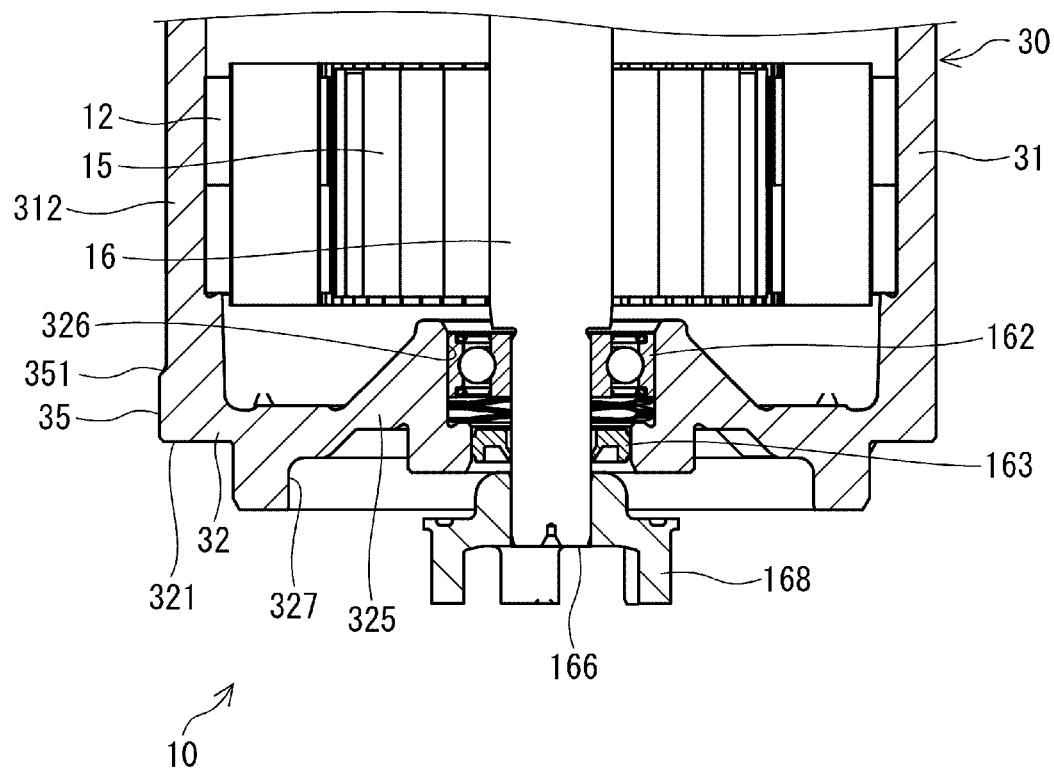
FIG. 8 is a cross-sectional view of the electric motor of the second embodiment.

A second embodiment will be described with reference to FIGS. 7 to 10. FIG. 7 is a cross-sectional view taken along a plane that extends through a center of each flange portion 34. FIG. 8 is a cross-sectional view taken along a plane that extends through a location where the flange portions 34 are not formed. In the first embodiment, the rotation of the electric motor 10 is transmitted to the speed reducing gear device 90 through the pulley 93. As shown in FIG. 7, in the present embodiment, the rotation of the electric motor 10 is transmitted to the speed reducing gear device 95 through joints. The speed reducing gear device 95 includes a gear housing 96, a rotatable shaft 97, a gear-side joint 98 and a rubber spring 99. Furthermore, a motor-side joint 168 is installed to the end portion 166 of the shaft 16 of the electric motor 10. In the present embodiment, the speed reducing gear device 95 serves as an external device, and the gear housing 96 serves as a housing.

The gear-side joint 98 is installed to an end portion of the rotatable shaft 97 located on the electric motor 10 side. The rubber spring 99 is installed between the motor-side joint 168 and the gear-side joint 98. The rubber spring 99 fills a gap between the joints 98, 168 and transmits the rotation of the electric motor 10 to the speed reducing gear device 90.

The electric motor 10 of the present embodiment differs from that of the first embodiment with respect to the motor case 30, so that the motor case 30 will be mainly described. As shown in FIGS. 7 and 8, similar to the first embodiment, the motor case 30 is shaped in the bottomed tubular form and is formed by, for example, aluminum die casting, and the motor case 30 includes a tubular portion 31 and a bottom portion 32. The tubular portion 31 is substantially the same as the tubular portion 21 of the first embodiment and has the frame member 18 at the opening part of the tubular portion 31. The shape of the respective flange portions 34 is substantially the same as that of the flange portions 24 of the first embodiment.

A bearing portion 325 is formed at the bottom portion 32. The bearing portion 325 projects on the speed reducing gear device 95 side of the contact surface 321 that is configured to contact the gear housing 96, and the bearing portion 325 is inserted into the gear housing 96. The bearing 162 and the oil seal 163 are installed at a hole 326 of the bearing portion 325. The end portion 166 of the shaft 16 and the motor-side joint 168 project from the motor case 30 and are received in a space that is formed by: a receiving recess 327, which is located on the speed reducing gear device 95 side of the bearing portion 325; and the gear housing 96.

Figure 9:
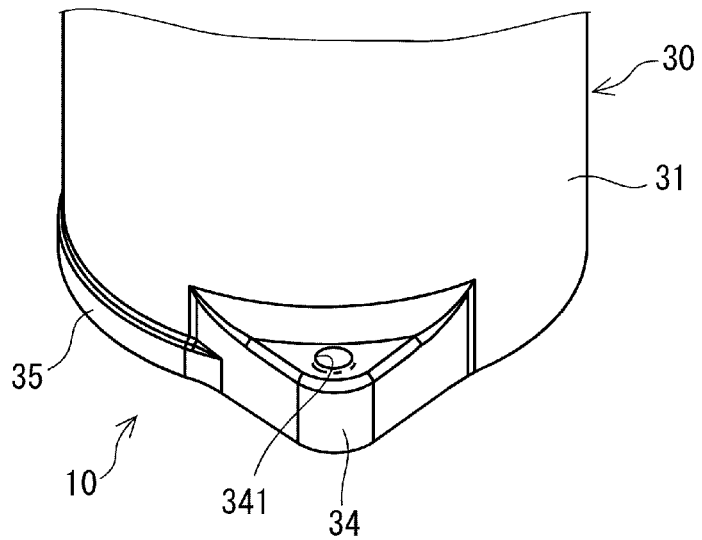
FIG. 9 is a perspective view of the electric motor of the second embodiment.
Figure 10:
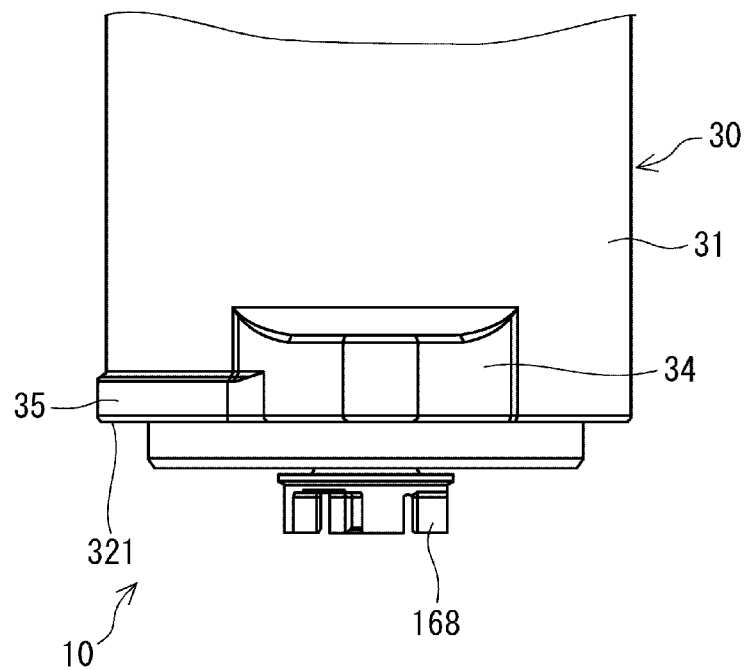
FIG. 10 is a side view of the electric motor of the second embodiment.

As shown in FIGS. 8, 9 and 10, a large diameter portion 35 is formed at the bottom portion 32 of the motor case 30 such that the large diameter portion 35 projects on a radially outer side of a stator fixation location (stator fixation portion) 312 of the tubular portion 31, to which the stator 12 is fixed. The large diameter portion 35 is formed continuously with the contact surface 321 of the bottom portion 32, which contacts the gear housing 96.

In the first embodiment, the large diameter portion 25 circumferentially extends all around. In contrast, in the present embodiment, the large diameter portion 35 circumferentially extends only about one half of the circumferential extent of the tubular portion 31, which is configured to be placed at the upper side in the vertical direction at the time of installing the drive apparatus 1 at the vehicle. Specifically, the large diameter portion 35 is circumferentially located between the two flange portions 34 and is formed at the side that becomes the upper side in the vertical direction at the time of installing the drive apparatus 1 at the vehicle, and the large diameter portion 35 is not formed at the other side (i.e., the lower side). The large diameter portion 35 is formed continuously with the flange portions 34. A stepped surface 351, which extends continuously in the circumferential direction, is formed between the tubular portion 31 and the large diameter portion 35.

In the present embodiment, the large diameter portion 35 is formed along only the part of the circumferential extent of the tubular portion 31. Thereby, the weight of the motor case 30 can be reduced or minimized. Furthermore, the advantages, which are similar to those discussed at the first embodiment, can be achieved. The motor case 30 of the present embodiment may be applied to the pulley type discussed in the first embodiment. Also, the motor case 20 of the first embodiment may be applied to the joint type discussed in the present embodiment. The manufacturing method of the motor case 20 is similar to that of the first embodiment. In the present embodiment, the discussion of the parting line and the gate residue is omitted for the sake of simplicity. This is also true in the third to fifth embodiments discussed below. That is, the parting line and the gate residue, which are similar to those discussed in the first embodiment, may be provided in the present embodiment and each of the following embodiments.

Third Embodiment

Figure 11:
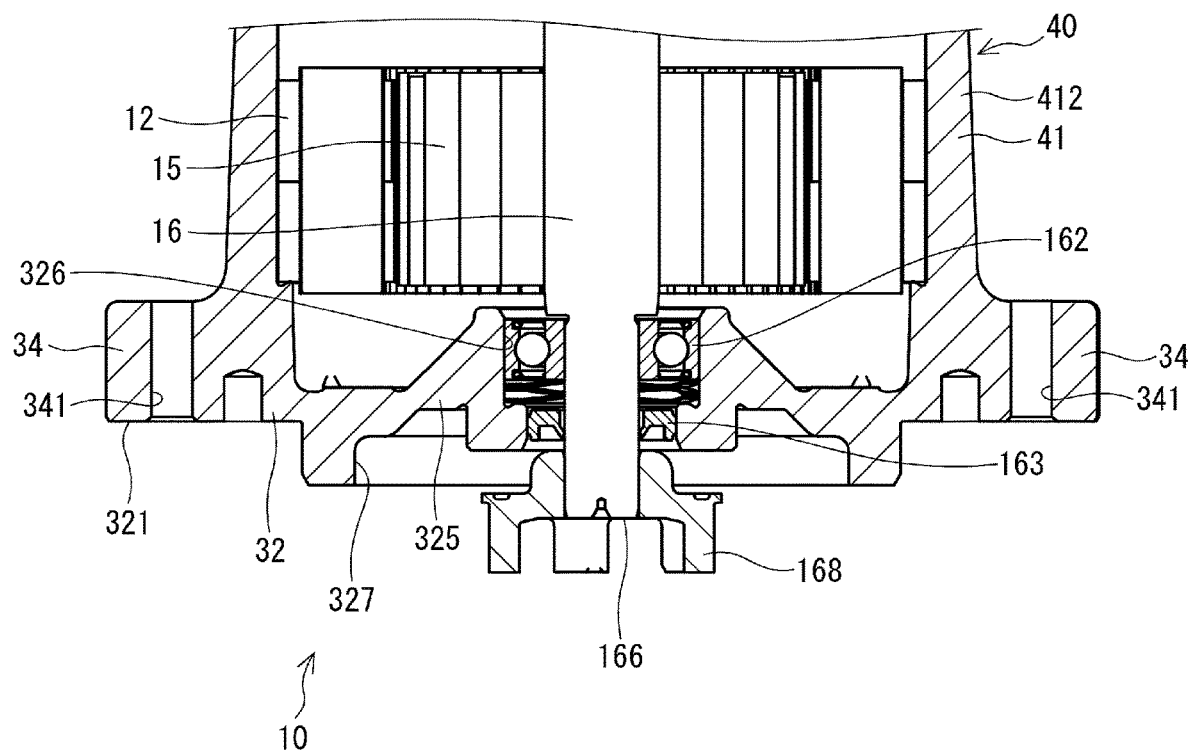
FIG. 11 is a cross-sectional view of an electric motor of a third embodiment.
Figure 12:
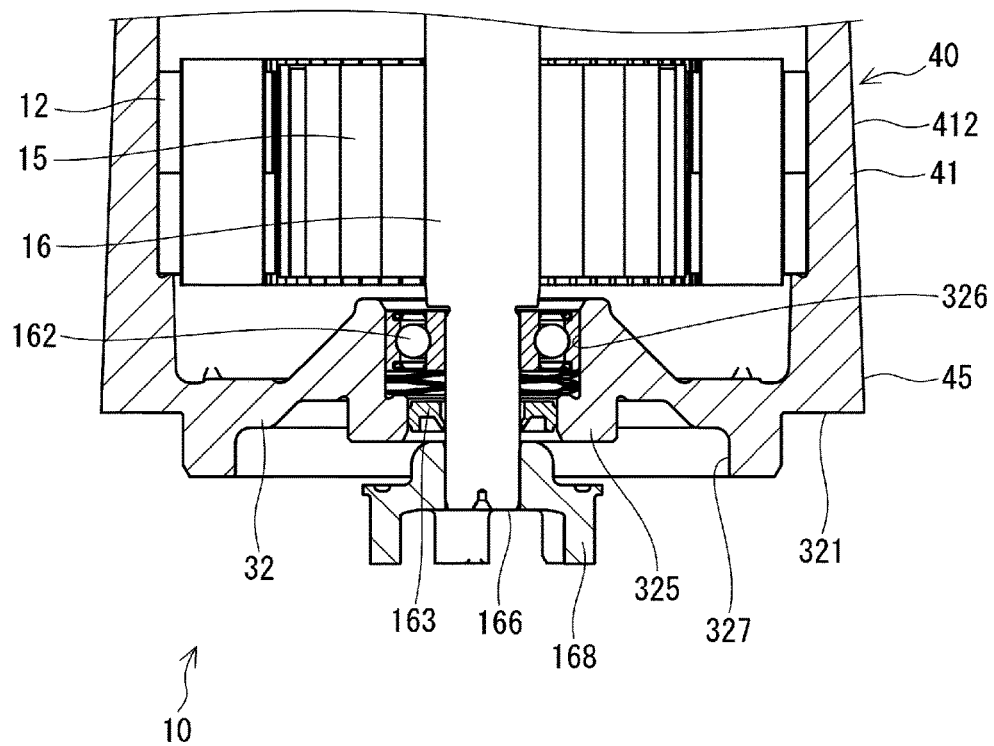
FIG. 12 is a cross-sectional view of the electric motor of the third embodiment.
Figure 13:
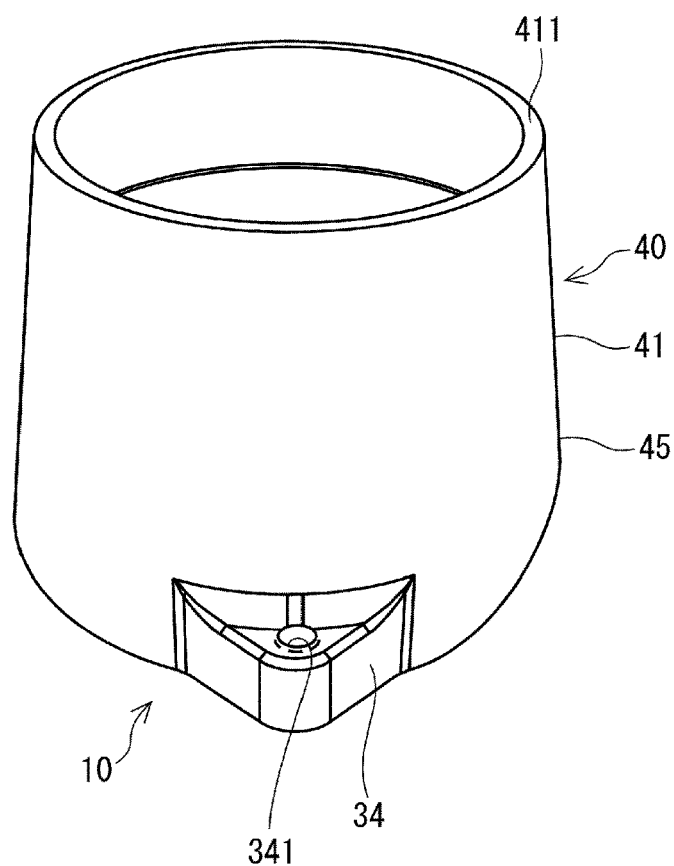
FIG. 13 is a perspective view of the electric motor of the third embodiment.
Figure 14:
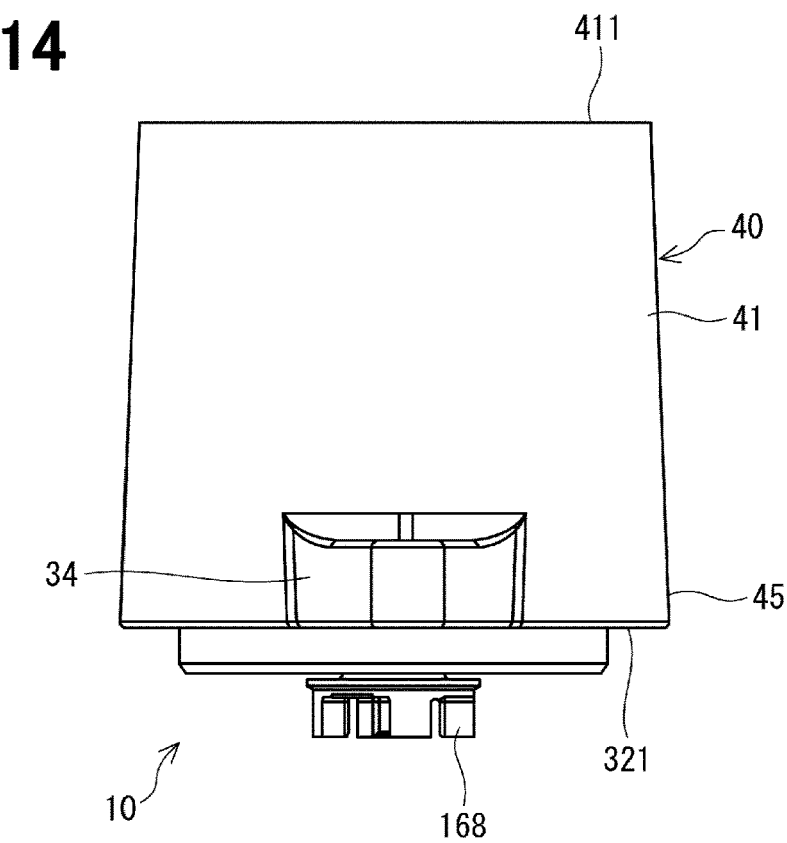
FIG. 14 is a side view of the electric motor of the third embodiment.

A third embodiment will be described with reference to FIGS. 11 to 14. FIG. 11 is a cross-sectional view taken along a plane that extends through a center of each flange portion 34. FIG. 12 is a cross-sectional view taken along a plane that extends through a location where the flange portions 34 are not formed. As shown in FIGS. 11 and 12, in the present embodiment, similar to the second embodiment, the motor-side joint 168 is installed to the end portion 166 of the shaft 16, and the rotation of the electric motor 10 is transmitted to the speed reducing gear device 95 (not shown in FIGS. 11 and 12) through the motor-side joint 168.

The motor case 40 of the present embodiment is shaped in the bottomed tubular form and includes a tubular portion 41 and the bottom portion 32. In the present embodiment, the tubular portion 41 is tapered such that the outer diameter of the bottom portion 32 side of the tubular portion 41 becomes larger than the outer diameter of the opening part 411 side of the tubular portion 41. Specifically, in the present embodiment, the tubular portion 41 is tapered such that the outer diameter of the bottom portion 32 side of the stator fixation location (stator fixation portion) 412 becomes large, and thereby a large diameter portion 45 is formed. Therefore, the tubular portion 41 does not have the stepped surface that forms the large diameter portion 45. Furthermore, a plate thickness (radial wall thickness) of the tubular portion 41 is set such that the plate thickness at the bottom portion 32 side of the tubular portion 41 is larger than the plate thickness at the opening part 411 side of the tubular portion 41.

The tubular portion 41 is tapered such that the outer diameter of the tubular portion 41 is progressively reduced toward the opening part 411 of the tubular portion 41, so that the draft angle is provided. Thus, similar to the first embodiment, the motor case 40 can be formed by two dies, which have a relatively simple structure and are respectively opened toward two opposite sides in the axial direction, without using the slide core.

In the present embodiment, the outside of the tubular portion 41 is tapered such that the diameter of the one axial side of the tubular portion 41, at which the bottom portion 32 is located, is larger than the diameter of the other axial side of the tubular portion 41, at which the opening part 411 of the tubular portion 41 is placed, and thereby the large diameter portion 45 is formed. Even with this configuration, the advantages, which are similar to those discussed in the above embodiments, can be achieved.

Fourth and Fifth Embodiments

Figure 15:
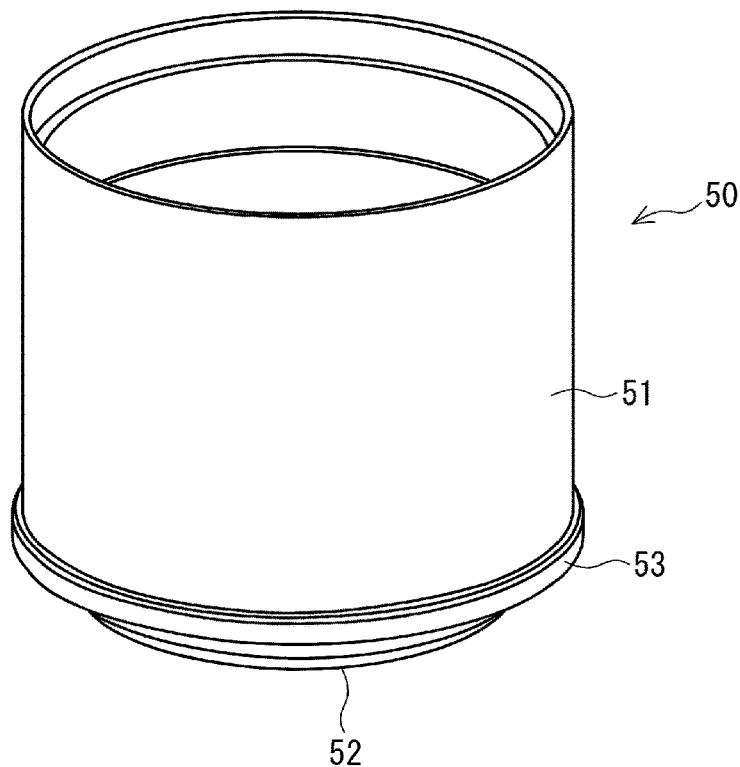
FIG. 15 is a perspective view of a motor case of a fourth embodiment.
Figure 16:
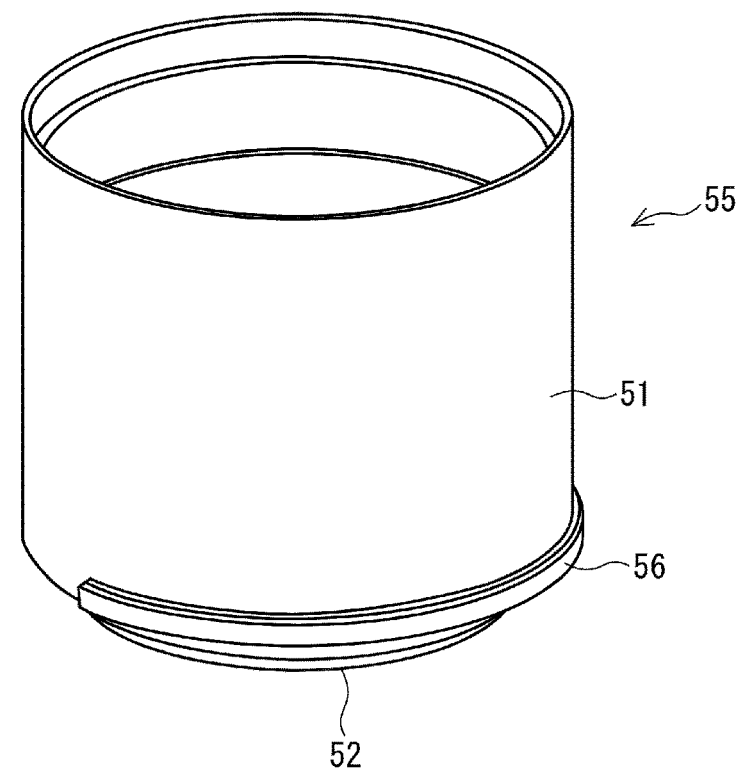
FIG. 16 is a perspective view of a motor case of a fifth embodiment.

A fourth embodiment will be described with reference to FIG. 15, and a fifth embodiment will be described with reference to FIG. 16. The fourth embodiment and the fifth embodiment differ from the above embodiments with respect to the shape of the motor case, so that this point will be described. As shown in FIG. 15, a motor case 50 of the fourth embodiment includes a tubular portion 51 and a bottom portion 52. The motor case 50 does not have the flange portions. At the motor case 50, a large diameter portion 53 is located on the bottom portion 52 side of the tubular portion 51 and circumferentially extends all around. As shown in FIG. 16, at the motor case 55 of the fifth embodiment, the large diameter portion 56 is located on the bottom portion 52 side of the tubular portion 51 and is formed along only a part of the circumferential extent of the tubular portion 51. In the fifth embodiment, at the time of installation to the vehicle, it is desirable to install the drive apparatus 1 such that the circumferential side, at which the large diameter portion 56 is formed, becomes the upper side in the vertical direction. In this way, even when the water is applied to the drive apparatus 1, it is possible to limit corrosion of the connection between the drive apparatus 1 and the speed reducing gear device 90. Furthermore, the advantages, which are similar to those discussed in the above embodiments, can be achieved.

Other Embodiments

In the above embodiments, the motor case is the product made by the aluminum die casting. In another embodiment, the motor case may be formed by another method that is other than the die casting. Furthermore, the motor case may be made of a material that is other than aluminum. In the above embodiments, the flange portions are formed at the two locations, respectively. In another embodiment, the flange portions may be eliminated, or the flange portion may be formed at one location or three or more locations. In the first and second embodiments, the large diameter portion is formed continuously with the flange portions. In another embodiment, the large diameter portion may be spaced from the flange portions.

In the above embodiments, the drive apparatus includes the electric motor and the controller, which are integrated together. In another embodiment, the electric motor and the controller may be formed separately. In the above embodiments, the speed reducing gear device serves as the external device. In another embodiment, the external device may be another device that is other than the speed reducing gear device.

In the above embodiments, the drive apparatus is applied to the electric power steering apparatus of the rack assist type. In another embodiment, the drive apparatus may be applied to another type of electric power steering apparatus, such as a column assist type, which is other than the rack assist type. Furthermore, the drive apparatus may be applied to another apparatus that is other than the electric power steering apparatus. The present disclosure should not be limited to the above embodiments and may be implemented in various other forms without departing from the scope of the present disclosure.

What is claimed is:

1. A drive apparatus configured to transmit rotation of an electric motor to an external device, comprising:
   a stator;
   a winding that is wound around the stator;
   a rotor that is configured to rotate relative to the stator;
   a shaft that is configured to rotate integrally with the rotor, wherein one end portion of the shaft is configured to be coupled with the external device; and
   a motor case that includes a tubular portion and a bottom portion to have a bottomed tubular form, which opens at a side that is opposite to the bottom portion, while the stator is fixed to the tubular portion, and the motor case is configured to be installed to a housing of the external device through the bottom portion, wherein:
   a large diameter portion is formed at an outer periphery of the bottom portion of the motor case and has an outer diameter, which is larger than an outer diameter of a stator fixation location of the motor case, to which the stator is fixed, while the large diameter portion is formed continuously with a contact surface of the bottom portion that is configured to contact the housing of the external device;
   the motor case includes a flange portion, wherein the flange portion radially outwardly projects from the tubular portion and is configured to be fixed to the housing of the external device with a fastener; and
   the large diameter portion is formed continuously with the flange portion.

2. The drive apparatus according to claim 1, wherein the large diameter portion has a cutout that is a recess, which opens toward a bottom surface side and a radially outer side of the large diameter portion.

3. The drive apparatus according to claim 1, where the motor case is made of metal and is formed integrally in one-piece.

4. The drive apparatus according to claim 1, wherein the contact surface radially extends along a plane perpendicular to a rotational axis of the rotor from a radially outer end of the large diameter portion to a location that is on a radially inner side of the tubular portion.

5. The drive apparatus according to claim 4, wherein the contact surface has a recess which is recessed toward the rotor in the axial direction of the rotor and is placed at least on a radially outer side of the tubular portion at the large diameter portion.

6. The drive apparatus according to claim 1, wherein the flange portion has a through hole through which the fastener is inserted and is fixed to the housing of the external device.

7. The drive apparatus according to claim 1, wherein the large diameter portion has a circumferential length larger than a circumferential length of the flange portion, and the large diameter portion radially projects from the tubular portion by a constant amount that is constant along an entire circumferential extent of the large diameter portion.

8. The drive apparatus according to claim 1, wherein the large diameter portion extends all around the tubular portion.

9. The drive apparatus according to claim 1, wherein the large diameter portion is formed along only a part of a circumferential extent of the tubular portion.

10. The drive apparatus according to claim 1, wherein a parting line, which radially outwardly projects and extends continuously in a circumferential direction, is formed at the large diameter portion.

11. The drive apparatus according to claim 10, wherein at least one location of the large diameter portion has a gate residue, which has a width that is larger than a width of the parting line.

12. The drive apparatus according to claim 2, wherein the cutout is formed at a location of the large diameter portion that does not become an upper side in a vertical direction at a time of installing the motor case to the external device.

13. The drive apparatus according to claim 1, wherein an outside of the tubular portion is tapered such that an outer diameter of one axial side of the tubular portion, at which the bottom portion is located, is larger than an outer diameter of another axial side of the tubular portion, at which an opening part of the tubular portion is placed.

* * * * *